United States Patent
Ramanandan et al.

(10) Patent No.: US 9,159,133 B2
(45) Date of Patent: Oct. 13, 2015

(54) ADAPTIVE SCALE AND/OR GRAVITY ESTIMATION

(71) Applicant: QUALCOMM Incorporated, San Diego, CA (US)

(72) Inventors: Arvind Ramanandan, San Diego, CA (US); Christopher Brunner, San Diego, CA (US); Mahesh Ramachandran, San Diego, CA (US); Murali Ramaswamy Chari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 14/014,174

(22) Filed: Aug. 29, 2013

(65) Prior Publication Data

US 2014/0126771 A1    May 8, 2014

Related U.S. Application Data

(60) Provisional application No. 61/722,601, filed on Nov. 5, 2012, provisional application No. 61/801,741, filed on Mar. 15, 2013.

(51) Int. Cl.
*G06K 9/00* (2006.01)
*G06T 7/00* (2006.01)

(52) U.S. Cl.
CPC .............. *G06T 7/004* (2013.01); *G06T 7/0044* (2013.01); *G06T 2207/30244* (2013.01)

(58) Field of Classification Search
USPC ................................................ 382/106, 154
See application file for complete search history.

(56) References Cited

U.S. PATENT DOCUMENTS

| | | | |
|---|---|---|---|
| 2003/0031382 A1* | 2/2003 | Broekaert | 382/286 |
| 2007/0233424 A1* | 10/2007 | Ohta | 702/154 |
| 2009/0161915 A1* | 6/2009 | Chen et al. | 382/107 |
| 2010/0174421 A1* | 7/2010 | Tsai et al. | 700/302 |
| 2010/0188510 A1* | 7/2010 | Yoo et al. | 348/164 |
| 2010/0208057 A1 | 8/2010 | Meier et al. | |
| 2010/0309321 A1 | 12/2010 | Brunner et al. | |

(Continued)

FOREIGN PATENT DOCUMENTS

WO    2012100829 A1    8/2012

OTHER PUBLICATIONS

Hol, J.D., et al., "Sensor Fusion for Augmented Reality", 2006 9th International Conference on Information Fusion, Fusion—2006 9th International Conference on Information Fusion, Fusion 2006 Inst. of Elec. and Elec. Eng. Computer Society US, IEEE, Piscataway, NJ, USA, Jul. 1, 2006, pp. 1-6, XP031042345, DOI: 10.1109/ICIF.2006. 301604 ISBN: 978-1-4244-0953-2 section 3. ; figures 1,2.

(Continued)

*Primary Examiner* — Alex Liew
(74) *Attorney, Agent, or Firm* — Silicon Valley Patent Group LLP

(57) ABSTRACT

Systems, apparatus and methods for estimating gravity and/or scale in a mobile device are presented. A difference between an image-based pose and an inertia-based pose is using to update the estimations of gravity and/or scale. The image-based pose is computed from two poses and is scaled with the estimation of scale prior to the difference. The inertia-based pose is computed from accelerometer measurements, which are adjusted by the estimation for gravity.

40 Claims, 10 Drawing Sheets

(56) References Cited

U.S. PATENT DOCUMENTS

| | | | |
|---|---|---|---|
| 2011/0032220 A1* | 2/2011 | Shih et al. | 345/204 |
| 2011/0206236 A1* | 8/2011 | Center, Jr. | 382/103 |
| 2012/0108292 A1 | 5/2012 | Zhong | |
| 2012/0176491 A1* | 7/2012 | Garin et al. | 348/113 |
| 2012/0176492 A1 | 7/2012 | Garin | |
| 2013/0335562 A1* | 12/2013 | Ramanandan et al. | 348/142 |
| 2014/0126771 A1* | 5/2014 | Ramanandan et al. | 382/103 |

OTHER PUBLICATIONS

International Search Report and Written Opinion—PCT/US2013/063900—ISA/EPO—Feb. 7, 2014.

Kneip, L., et al., "Deterministic initialization of metric state estimation filters for loosely-coupled monocular vision-inertial systems", Intelligent Robots and Systems (IROS), 2011 IEEE/RSJ International Conference On, IEEE.Sep. 25, 2011, pp. 2235-2241, XP032200896, DOI: 10.1109/IROS.2011.6094699 ISBN: 978-1-61284-454-1 section II; equation (11).

Nutzi, G., et al., "Fusion of IMU and Vision for Absolute Scale Estimation in Monocular SLAM", Journal of Intelligent and Robotic Systems, vol. 61, No. 1-4, Nov. 12, 2010, pp. 287-299, XP055094343, ISSN: 0921-0296, DOI:10.1007/s10846-010-9490-zsection 5.

Qian, G., et al., "Robust structure from motion estimation using inertial data", Journal of the Optical Society of America.A, Optics and Image Science, Optical Society of America, US, vol. 18, No. 12, Dec. 1, 2001, pp. 2982-2997, XP002358939, ISSN: 0740-3232, DOI:10.1364/JOSAA.18.002982 p. 2984 -p. 2985 ; figure 1.

Weiss, S., et al., "Real-time on board visual-inertial state estimation and self-calibration of MAVs in unknown environments", Robotics and Automation (ICRA), 2012 IEEE International Conference On, IEEE, May 14, 2012, pp. 957-964, XP032450878, DOI: 10.1109/ICRA.2012.6225147 ISBN: 978-1-4673-1403-9 sections II. A, II. B; pp. 958-960; figure 2.

You, S., et.al., "Fusion of Vision and Gyro Tracking for Robust Augmented Reality Registration", Proceedings IEEE 2001 Virtual Reality, 2001, pp. 71-78, Jan. 1, 2001, pp. 71-78, XP031172752, DOI:10.1109/VR.2001.913772, ISBN : 978-0-7695-0948-8 figures 2,6.

Jekeli C., "Inertial Navigation Systems with Geodetic Applications", Chapters 3 and 4, 2001, 90 Pages.

Jones E.S., et al., "Visual-Inertial Navigation, Mapping and Localization: A Scalable Real-Time Causal Approach," International Journal of Robotics Research, Sep. 23, 2010, pp. 1-38.

* cited by examiner

ADAPTIVE SCALE AND/OR GRAVITY ESTIMATION

CROSS-REFERENCE TO RELATED APPLICATIONS

This application claims the benefit of and priority under 35 U.S.C. §119(e) to U.S. Provisional Application No. 61/801,741, filed Mar. 15, 2013, and U.S. Provisional Application No. 61/722,601, filed Nov. 5, 2012, both of which are entitled "Adaptive Scale and/or Gravity Estimation," and both of which are incorporated herein by reference in their entireties.

BACKGROUND

I. Field of the Invention

This disclosure relates generally to systems, apparatus and methods in the field of scale and/or gravity estimation, and more particularly to estimating scale and/or gravity by comparing an inertia-based pose formed from an earlier estimate of gravity with an image-based pose formed from an earlier estimate of scale.

II. Background

Some systems user computer vision algorithms on images for augmented reality (AR) applications and to determine an estimate of scale. The estimate of scale is multiplied by a pose to determine how far away an object is from a camera. Other systems use inertial sensors to determine movement (e.g., via dead reckoning) by determining an estimate of gravity. Accelerometer measurements are adjusted by the estimate of gravity to determine linear acceleration. A means is needed to coordinate determination of both scale and gravity for systems with both a camera and inertial sensors.

BRIEF SUMMARY

Disclosed are systems, apparatus and methods for estimating pose in a mobile device.

According to some aspects, disclosed is a method for estimating in a mobile device, the method comprising: determining a first pose, from a first image captured at a first time, between a target and a first position of a camera of the mobile device, wherein the first image contains the target; determining a second pose, from a second image captured at a second time, between the target and a second position of the camera, wherein the second image contains the target; computing an image-based pose between the first pose and the second pose using a first estimation of a scaling factor; receiving measurements from an accelerometer of the mobile device from the first time to the second time; forming an inertia-based pose based on the measurements from the accelerometer and a first estimation for a gravity vector; computing a difference between the image-based pose and the inertia-based pose; and forming at least one of a second estimation of the gravity vector or a second estimation of the scaling factor based on the difference.

According to some aspects, disclosed is a mobile device for estimating in the mobile device, the mobile device comprising: a camera configured to: capture, at a first time and a first position of the camera, a first image containing a target; and capture, at a second time and a second position of the camera, a second image containing the target; an accelerometer configured to provide measurements from the first time to the second time; and a processor coupled to the camera and to the accelerometer and configured to: determine a first pose between the target of the mobile device from the first image; determine a second pose between the target of the mobile device from the second image; compute an image-based pose between the first pose and the second pose using a first estimation of a scaling factor; form an inertia-based pose based on the measurements and a first estimation for a gravity vector; compute a difference between the image-based pose and the inertia-based pose; and form at least one of a second estimation of the gravity vector or a second estimation of the scaling factor based on the difference.

According to some aspects, disclosed is a mobile device for estimating in the mobile device, the mobile device comprising: means for determining a first pose, from a first image captured at a first time, between a target and a first position of a camera of the mobile device, wherein the first image contains the target; means for determining a second pose, from a second image captured at a second time, between the target and a second position of the camera, wherein the second image contains the target; means for computing an image-based pose between the first pose and the second pose using a first estimation of a scaling factor; means for receiving measurements from an accelerometer of the mobile device from the first time to the second time; means for forming an inertia-based pose based on the measurements from the accelerometer and a first estimation for a gravity vector; means for computing a difference between the image-based pose and the inertia-based pose; and means for forming at least one of a second estimation of the gravity vector or a second estimation of the scaling factor based on the difference.

According to some aspects, disclosed is a non-transitory computer-readable storage medium including program code stored thereon for a mobile device to estimate in the mobile device, comprising program code to: determine a first pose, from a first image captured at a first time, between a target and a first position of a camera of the mobile device, wherein the first image contains the target; determine a second pose, from a second image captured at a second time, between the target and a second position of the camera, wherein the second image contains the target; compute an image-based pose between the first pose and the second pose using a first estimation of a scaling factor; receive measurements from an accelerometer of the mobile device from the first time to the second time; form an inertia-based pose based on the measurements and a first estimation for a gravity vector; compute a difference between the image-based pose and the inertia-based pose; and form at least one of a second estimation of the gravity vector or a second estimation of the scaling factor based on the difference.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWING

Embodiments of the invention will be described, by way of example only, with reference to the drawings.

DETAILED DESCRIPTION

Figure 1:
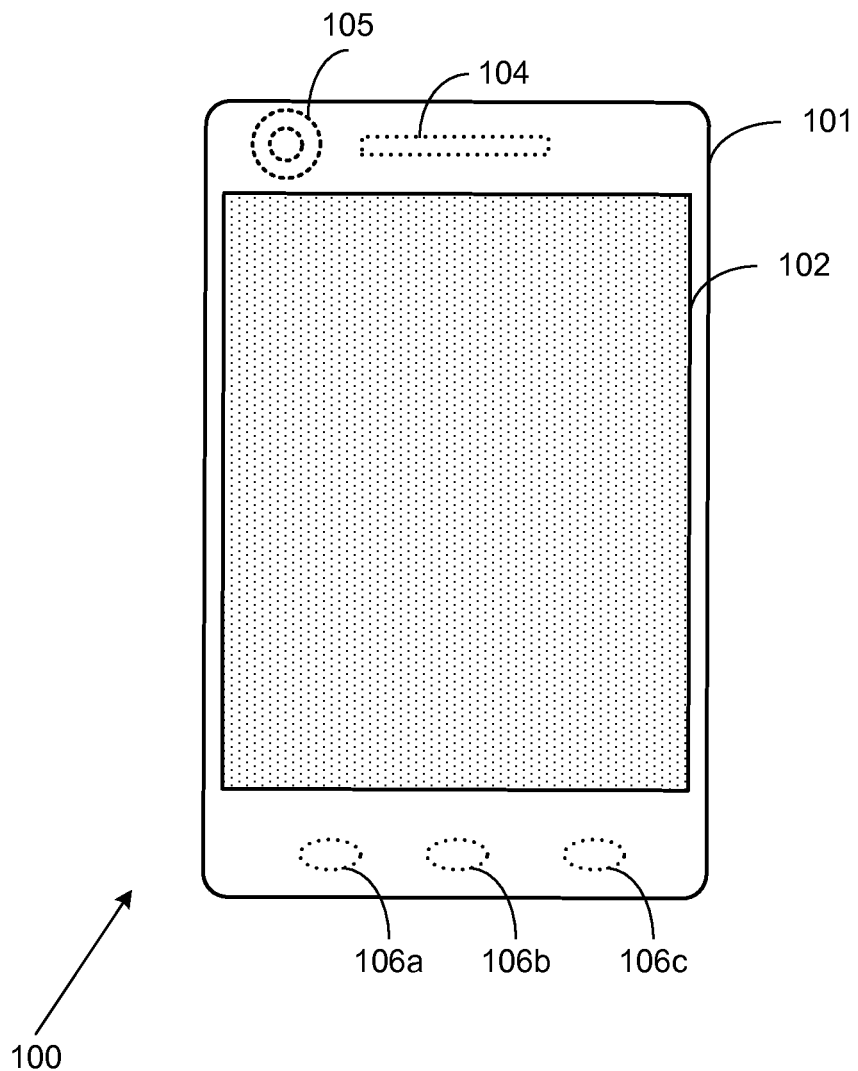
FIG. 1 illustrates an example device, in accordance with some embodiments of the present invention.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

As used herein, a mobile device, sometimes referred to as a mobile station (MS) or user equipment (UE), such as a cellular phone, mobile phone or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile device" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile device."

Embodiments of at least scale and/or gravity estimation are described herein. In some embodiments, the scale and/or gravity estimation is based on one or more images and/or inputs from one or more inertial sensors. In some embodiments, the scale and/or gravity estimation may be used with image processing, computer vision, object and/or movement tracking, and/or augmented reality. One or more embodiments are described below with respect augmented reality applications, devices, and/or circumstances, but embodiments are not limited to those described. For example, embodiments herein may be used in any situation or function in which scale and/or gravity is estimated, for example based on one or more images and/or inputs from one or more inertial sensors.

In some embodiments, functions as described herein are performed substantially in real-time. In other embodiments, an image and/or sensor measurements are stored for later processing, or processing is based on a stored and/or received image and/or sensor measurements. In some embodiments, one or all of the functions described herein may be performed at a mobile device, for example a smartphone or tablet or other device. In some embodiments, one or more of the functions described herein may be performed at a server or other computing device based at least in part on information received from a mobile device. In some embodiments, performance of one or more of the functions described herein may be split between a mobile device and a server or other computing device in communication with the mobile device.

Certain embodiments may include processing an image or other visual input, for example in order to identify or more objects or targets and/or to track movement of elements and/or of a device, for example a device capturing the image or other visual input. In some circumstances and/or applications, for example augmented reality (AR) applications, using a vision aided inertial navigation system (INS) may provide substantially improved performance over the vision only approach. For example, using vision aided INS may be beneficial in applications using a known and/or fixed target. Inertial sensors may track accurately in the short term and may be used to track quick phone movements, for example typical to gaming or AR applications, in some embodiments. Further, fusing inertial sensor input and/or measurements with computer vision may mitigate potential drift, for example, in translation that may occur if inertial sensors are used alone in the long term. A vision aided inertial navigation system may offer robust tracking, even when lighting and/or feature point count degrades.

In some embodiments, the INS comprises an attitude-only-INS, for example using only gyroscope information. In some embodiments, the INS comprises a 6 degree-of-freedom (DOF) INS, for example that uses both accelerometer and gyroscope measurements. When using accelerometer information in addition to gyroscope information, for example in a 6 DOF INS, it may be beneficial to know the gravity, for example as represented by a gravity vector, in a fixed target frame. Further, it may be beneficial to know the scale of a target, for example such that locations of features of the target may be converted from one or more units to one or more other units, for example from units normalized to the target to metric units. Locations of features on a known target may be expressed in units normalized to the target size to support various target sizes. Target size may be referred to as the scale of the target herein and is defined by a scaling factor. In some embodiments, an accelerometer may use a visual modality (for example an image or visual input) to provide feature location in metric units. Conversion of feature locations from units normalized to the target size to metric units may therefore be beneficial for at least this use of the accelerometer.

In some embodiments, the gravity vector and/or the scale of a target may be known or determined from user input of scale information and/or viewing the target in some known orientation (for example, such that gravity vector is known). If the target scale and gravity vector are known, a vision based INS using a filter, for example an Extended Kalman Filter (EKF) based vision aided INS, may be used to estimate camera pose (or pose of another sensor capturing visual input) and/or inertial sensor calibration. In some embodiments, an EKF based vision aided INS may provide optimal estimates of the camera pose and inertial sensor calibration up to linearization error(s).

In some embodiments, the gravity, for example in the form of a gravity vector, and/or the scale of the target may be adaptively estimated. For example, vision measurements may be used in fusion with inertial measurements to estimate pose, for example body or device pose, as well as varying biases and/or gravity. In some embodiments, a filter is used to estimate poses from feature points of a target and inertial sensor readings. Further, gravity and target scale may be estimated in the filter. Some such embodiments may perform such estimation without input from the user and/or without requiring a known target orientation. Further, such estimates may be determined from scratch and/or without a known target (e.g., reference free) in some embodiments. Some embodiments may be used with augmented reality applications.

FIG. 1 illustrates an augmented reality enabled device. As shown in FIG. 1, the augmented reality enabled device (ARD) or mobile device 100 may include housing 101, display 102, one or more speakers 104, and/or one or more hardware or software buttons 106. In some embodiments, a microphone may be included in place of one of the buttons 106 or in addition to the buttons 106. The display 102, which may be a touch screen display, may illustrate images captured by camera 105, or any other desired user interface information. Of course, the mobile device 100 may include additional components that are not illustrated, and one or more components may be omitted.

The mobile device 100 may comprise any portable electronic device such as a cellular or other wireless communication device, personal communication system (PCS) device, personal navigation device (PND), Personal Information Manager (PIM), Personal Digital Assistant (PDA), laptop or other mobile platform. The mobile platform may be capable of receiving wireless communication and/or navigation signals, such as navigation positioning signals. The term ARD may also include devices which communicate with a personal navigation device (PND), such as by short-range wireless, infrared, wireline connection, or other connection, regardless of whether satellite signal reception, assistance data reception, and/or position-related processing occurs at the device or at the PND. ARD may also include all electronic devices, including wireless communication devices, computers, laptops, tablet computers, smart phones, digital cameras etc. which are capable of capturing images used in tracking and/or capable of performing augmented reality functions.

Figure 2:
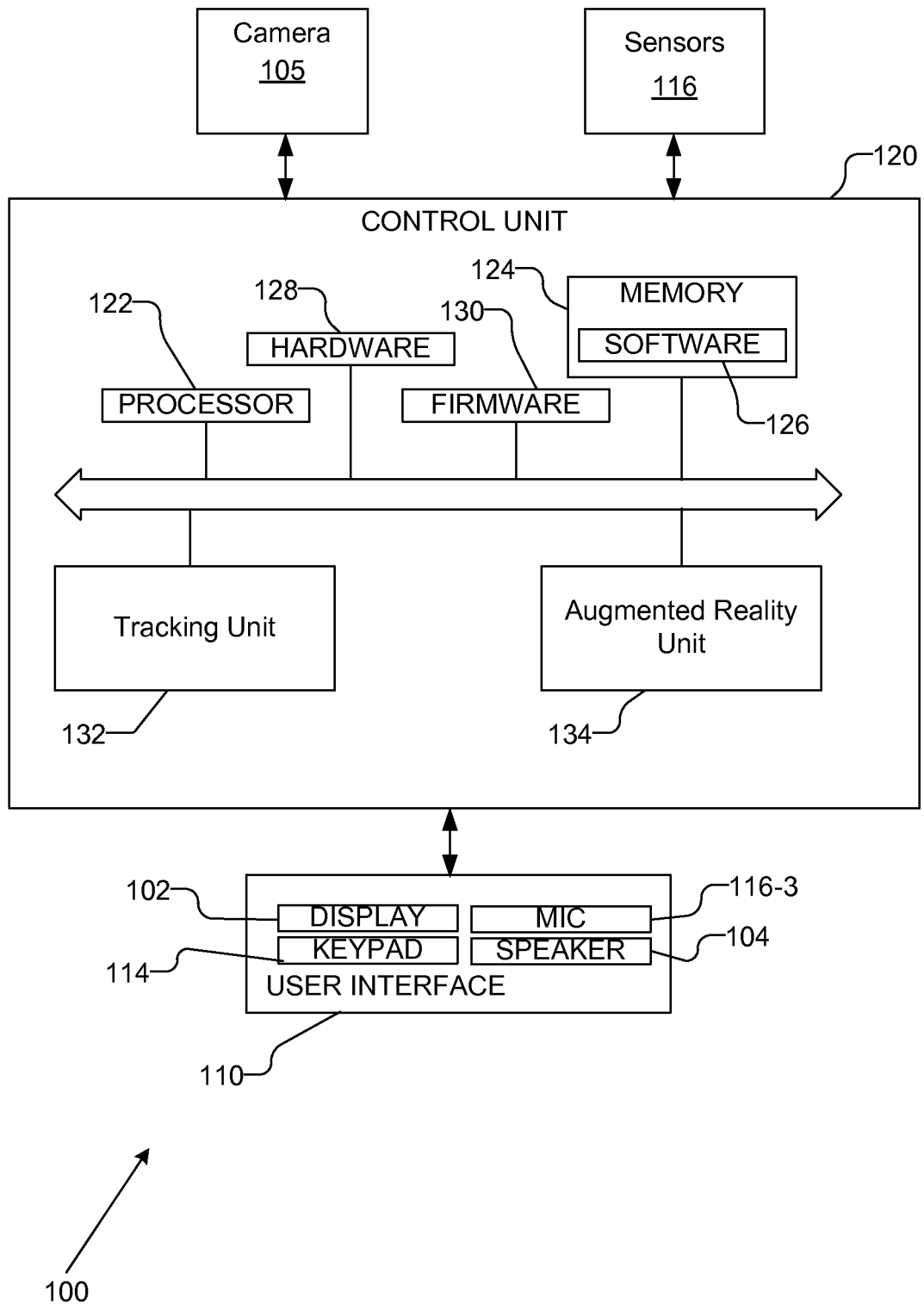
FIG. 2 illustrates an example block diagram of the device illustrated in FIG. 1, in accordance with some embodiments of the present invention.

FIG. 2 illustrates an example block diagram of elements of the mobile device 100. The mobile device 100 may include the camera 105 for capturing images of the environment, which may be either individual photos or frames of video, or may include another visual sensor. The mobile device 100 may also include sensors 116, for example inertial sensors, which may provide data with which the mobile device 100 can determine its position and/or orientation or pose. Examples of the sensors 116 may include accelerometers 116-1, quartz sensors, gyroscopes 116-2, micro-electromechanical system (MEMS) sensors used as linear accelerometers, as well as magnetometers. For example, the sensors 116 may comprise a gyroscope (e.g., a calibrated gyroscope to minimize biases) and an accelerometer in some embodiments. The mobile device 100 may also include a user interface 110 that includes display 102 capable of displaying images. The user interface 110 may also include a keypad 114 or other input device through which the user can input information into the mobile device 100. If desired, a virtual keypad may be integrated into the display 102 with a touch sensor. The user interface 110 may also include the microphone 116-3 and one or more speakers 104, for example if the mobile platform is a cellular telephone.

The mobile platform of the mobile device 100 further includes a control unit 120 that is connected to and communicates with the camera 105 and sensors 116, as well as the user interface 110, along with any other desired features. The control unit 120 may be provided by one or more processors 122 and associated memory/storage 124. The control unit 120 may also include software 126, as well as hardware 128, and firmware 130. The control unit 120 includes a tracking unit 132 configured to track the position of the mobile device 100 and/or positions of one or more objects monitored by the mobile device 100. The control unit 120 may further include augmented reality unit 134 configured to present augmented reality content on the display 102 of the mobile device 100. The tracking unit 132 and augmented reality unit 134 are illustrated separately from processor 122, memory 124, hardware 128, and/or firmware 130 for clarity, but may be combined in any of these components or may be implemented in all of these units. In some embodiments, portions of the augmented reality unit 134 are implemented across the processor 122, memory 124, hardware 128, and/or firmware 130, for example in a distributed manner. In some embodiments, the augmented reality unit 134 is implemented the processor 122 and/or hardware 128 based on instructions in the software 126 and the firmware 130. In some embodiments, the tracking unit is implemented by the augmented reality unit 134, and/or by one or more of the processor 122, memory 124, hardware 128, and/or firmware 130. Of course, the mobile device 100 may include additional components that are not illustrated, and one or more components may be omitted.

In some embodiments, a camera pose, accelerometer bias, gyroscope bias, camera-to-inertial calibration, gravity vector in a target frame, and target scale are jointly observable as unknowns with computer vision pose measurements. For example, these unknowns may be observable under certain constraints on the unknowns (e.g., constant biases, constant camera-to-inertial calibration, etc.) and/or motion (e.g., non-zero translational acceleration and/or rotational velocity, etc.). For example, the pose of the camera 105, bias of an accelerometer of the sensors 116, a bias of a gyroscope 116-2 of the sensors 116, and/or calibration of the camera-to-sensors calibration may be jointly observable as unknowns.

In the embodiment below, X denotes one or more INS states. For example, X may denote camera pose, accelerometer and/or gyro biases, etc. Further, Y denotes gravity and/or target scale parameters in the embodiment described below. Additionally, C denotes pose of the camera 105 computed by a vision modality in the description below.

The Bayesian philosophy may be used to maximize a joint probability distribution of the computer vision pose (C), INS states (X) and scale and gravity (Y). This relationship is shown in the Formula I, below.

$$[X^*, Y^*] = \arg\max p(X, Y, C) \quad (1)$$

As used herein, the symbols $X^*$ and $Y^*$ denote the Maximum-A-Posteriori (MAP) estimates of X and Y. Those having skill in the art will appreciate, however, that other estimates of an INS state, gravity, and/or scale may be derived instead or in addition. In some embodiments, arg max represents the argument of the maximum, for example the set of points of the given argument for which the given function attains its maximum value.

Figure 3:
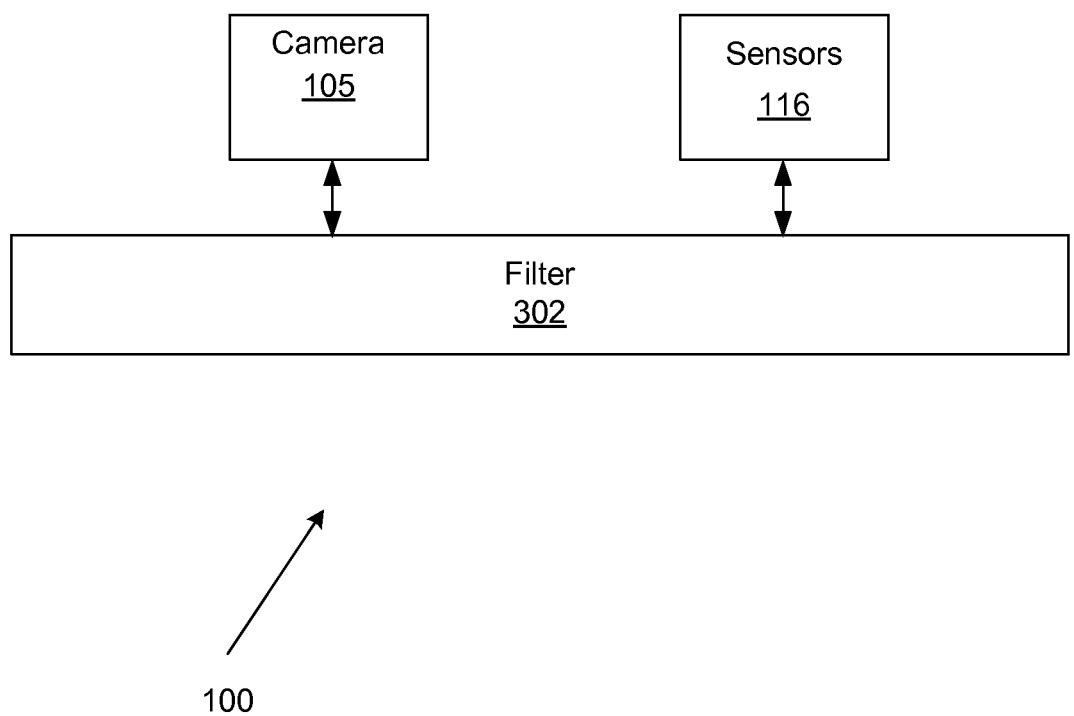
FIG. 3 illustrates an example block diagram of the device illustrated in FIG. 1, in accordance with some embodiments of the present invention.

The MAP estimate may be computed using an adaptive approach. For example, the MAP estimate may be computed using a filter. An example of a filter 302 is illustrated in FIG. 3. The filter 302 may be a function or module in a processor 122 or in dedicated hardware. In some embodiments, the filter, for example the filter 302, comprises an EKF. The filter may be implemented in the tracking unit 132, the augmented reality unit 134, and/or in any of the processor 122, memory 124, hardware 128, and/or firmware 130. In some embodiments, the filter is implemented separate from any of the components recited above.

In some embodiments, state space consists of a gyroscope bias, an attitude, an accelerometer bias, a position, a velocity, an angular velocity, an angular acceleration, a translational acceleration, a translational jerk, a gravity, and/or a target scale. States may be updated with gyroscope measurements from a gyroscope 116-2, accelerometer measurements from an accelerometer 116-1, and/or pose measurements from the camera 105.

In some embodiments, a user holding a device such as the mobile device 100 typically causes enough rotation to allow an EKF to achieve gravity and accelerometer disambiguation within a short time, for example 2-3 seconds. Further, assigning a relatively high process noise to the state of target scale may promote convergence. For example, a process noise of 1e-1 has been shown to achieve convergence within about 3-4 seconds. Scheduling may be determined accordingly. For example, high process noise may be set for the first seconds (to allow for fast convergence) and then reduced later to account for the fact that the size of the target is not changing. In this way, embodiments may be performed without input from the user. Further, the filter "tightens" within a few seconds, even when no prior information is known and improved tracking may result.

Figure 4:
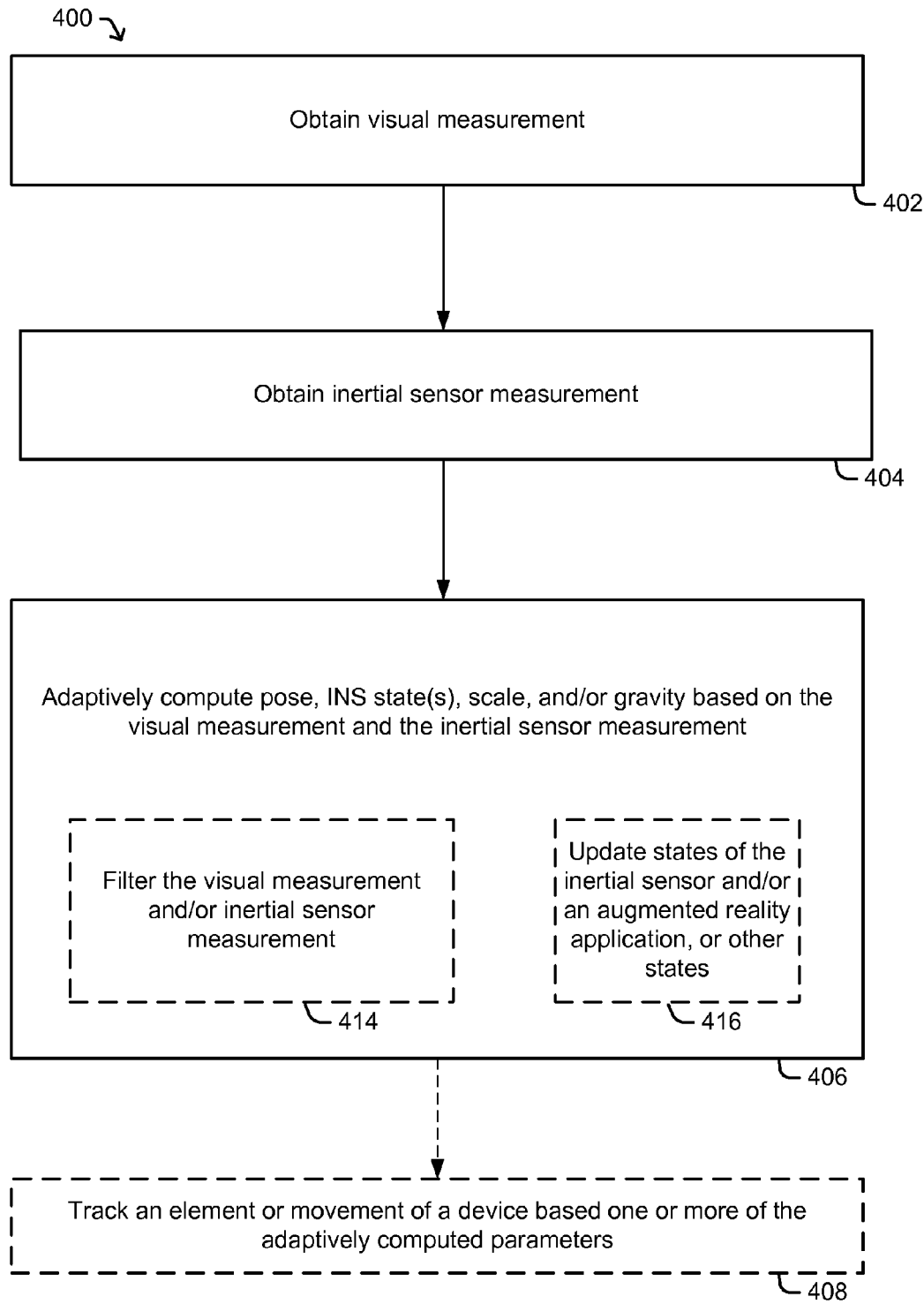
FIG. 4 illustrates an example of a method of estimating pose, states of an inertial navigation system, scale, and/or gravity, in accordance with some embodiments of the present invention.

FIG. 4 illustrates an example process 400. At 402, one or more visual measurements are obtained, for example using the camera 105. At 404, one or more inertial sensor measurements are obtained, for example using the sensors 116. In some embodiments, measurements are obtained from a gyroscope and accelerometer at 404.

At 406, pose, INS state(s), scale, and/or gravity are calculated based on the measurements obtained at 402 and 404, for example using the augmented reality unit 134, the processor 122, memory 124, hardware 128, and/or firmware 130. MAP estimates of one or more of these parameters may be computed pursuant to Formula I at 406.

In some embodiments, the computation performed at 406 comprises filtering at 414 the measurements from 402 and/or 404, for example using the filter 302. In some embodiments, 406 further comprises updating at 416 states of the inertial sensor, for example the sensor 116, and/or an augmented reality application, or other state. The augmented reality unit 134, the tracking unit 132, the processor 122, memory 124, hardware 128, and/or firmware 130 may be used to perform 416.

In some embodiments, the process 400 further comprises tracking an element, for example a target, or movement of a device, for example, the mobile device 100 or other device implemented the process 400, based one or more of the parameters adaptively computed at 406. For example, the tracking unit 132 may perform 132.

Advantages of the embodiments described above may include fast and accurate estimation of gravity with respect to a visual target, as well as fast and accurate estimation of scale of the visual target. The scale or scaling factor may comprise a ratio between actual target size and target size in a data base, for example. An accelerometer may thus be used addition to a gyroscope to fuse poses from computer vision with inertial sensor measurements, which may be optimal up to linearization errors in some embodiments. Further, scale augmentations may be determined in absolute dimensions. Thus, a size of augmentations may not be a function of target size. Further, augmentations may be oriented with respect to gravity (e.g. in a game, it may be expected that the figures line up with gravity).

In some embodiments, a scale in x and y (or any two dimensions) may be estimated. For example, targets are often printed with an incorrect aspect ratio (e.g., "fit image to selected paper size"). Estimation of target scale in x and y may address this issue. Further, a computer vision pose may be derived from a natural feature tracker pursuant to the above describe embodiments. In some embodiments, PTAM pose measurements may be input into an EKF framework, for example may be fed into the filter 302, in addition to inertial measurements to obtain scale and gravity in addition to improved tracking robustness.

In some embodiments, if a visual sensor is moved such that a target is no longer in view, the target's orientation is then changed such that the gravity vector changes direction, and then the visual sensor is moved such that the target is in view, embodiments described herein may perform without or with little difference in performance, for example in asymptotic time. For example, this may be achieved using adaptive gravity estimation.

In some embodiments, if a visual sensor is moved such that a target is no longer in view, the target is replaced with a similar target of a different size, and then the visual sensor is moved such that the target is in view, embodiments described herein may perform without or with little difference in performance, for example in asymptotic time. For example, this may be achieved using adaptive scale estimation.

Figure 5:
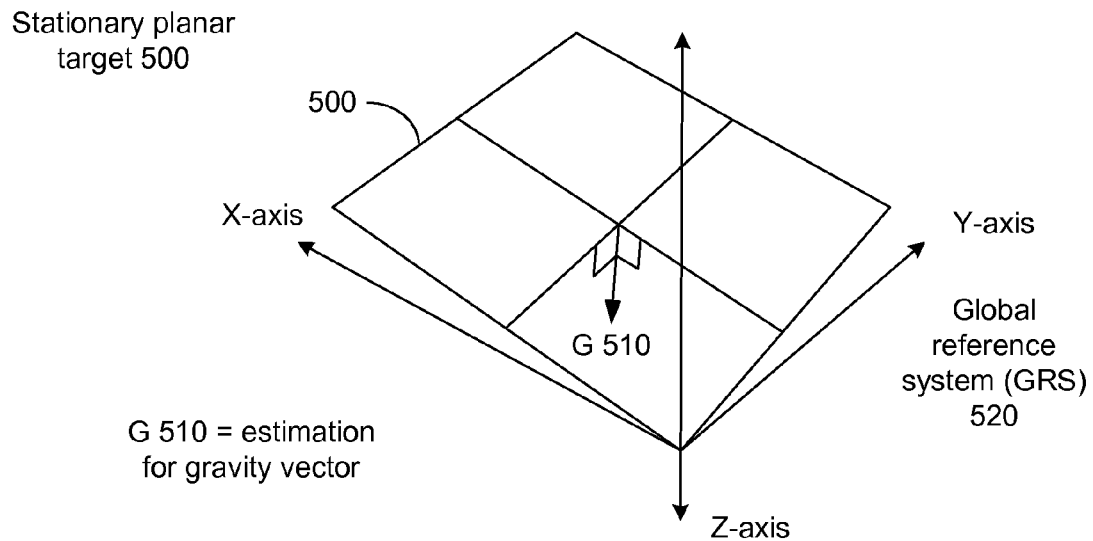
FIGS. 5-7 show a stationary planar target and a perpendicular gravity vector, in accordance with some embodiments of the present invention.
Figure 6:
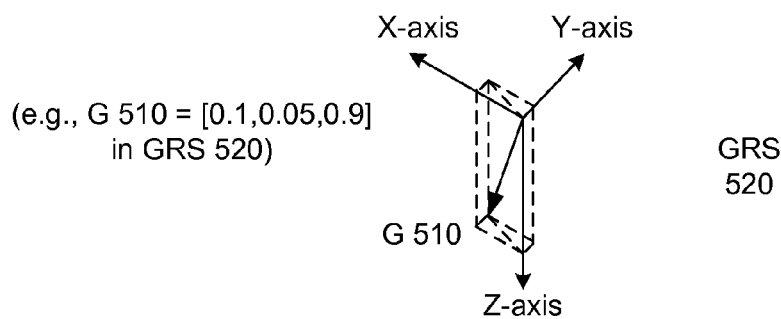
Figure 7:
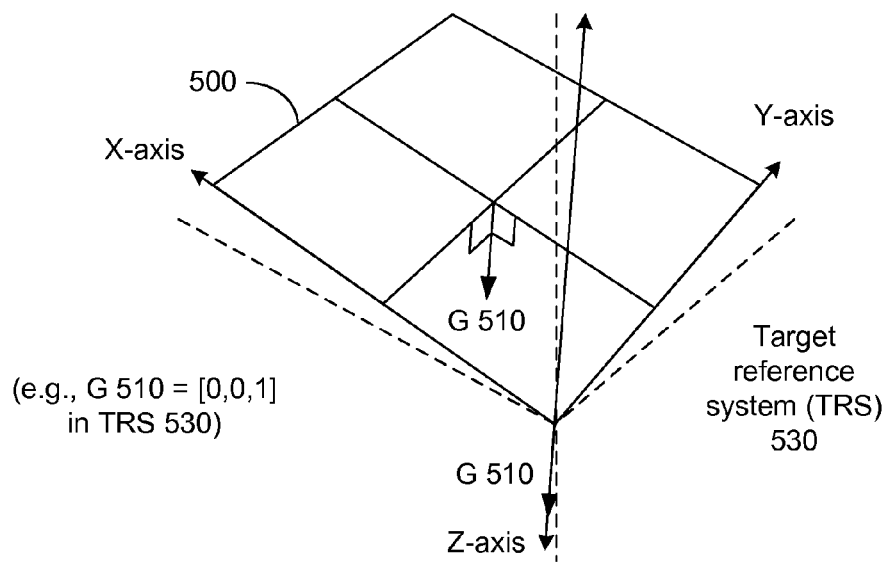

FIGS. 5-7 show a stationary planar target 500 and a perpendicular gravity vector, in accordance with some embodiments of the present invention. In FIG. 5, a stationary planar target 500 is shown with respect to a global reference system (GRS 520). The X-axis and Y-axis forms a plane represented by longitude and latitude. The Z-axis represents a direction of theoretical gravity [0, 0, 1] or actual gravity for a certain part of the world, which may be represented as, for example, [0, 0, 9.79] for San Diego in the GRS 520. The stationary planar target 500 is not moving with respect to the GRS 520 and is not aligned it the X-Y plane. A first guess or a first estimation G 510 for the gravity vector may be set perpendicular to the plane of the stationary planar target 500, which is independent of a target reference system (TRS 530). The first estimation G 510 may be received, preset, set on each occurrence, previously determined or stored in memory and may be common or unique for different AR applications. In FIG. 6, G 510, the estimation for the gravity vector, is shown with respect to the GRS 520. In this example, G, in terms of $[x,y,z]_{GRS}$, is approximately equal to $[0.1, 0.05, 0.9]_{GRS}$. In FIG. 7, the stationary planar target 500 is shown in a target reference system (TRS 530) (solid axis) in relation to the GRS 520 (dotted lines). The stationary planar target 500 defines the TRS 530. The plane of the stationary planar target 500 is in the X-Y plane of the TRS 530. G 510 is directed along the Z-axis such that the initial guess or estimation for gravity is $[x,y,z]_{TRS} = [0,0,1]_{TRS}$.

Figure 8:
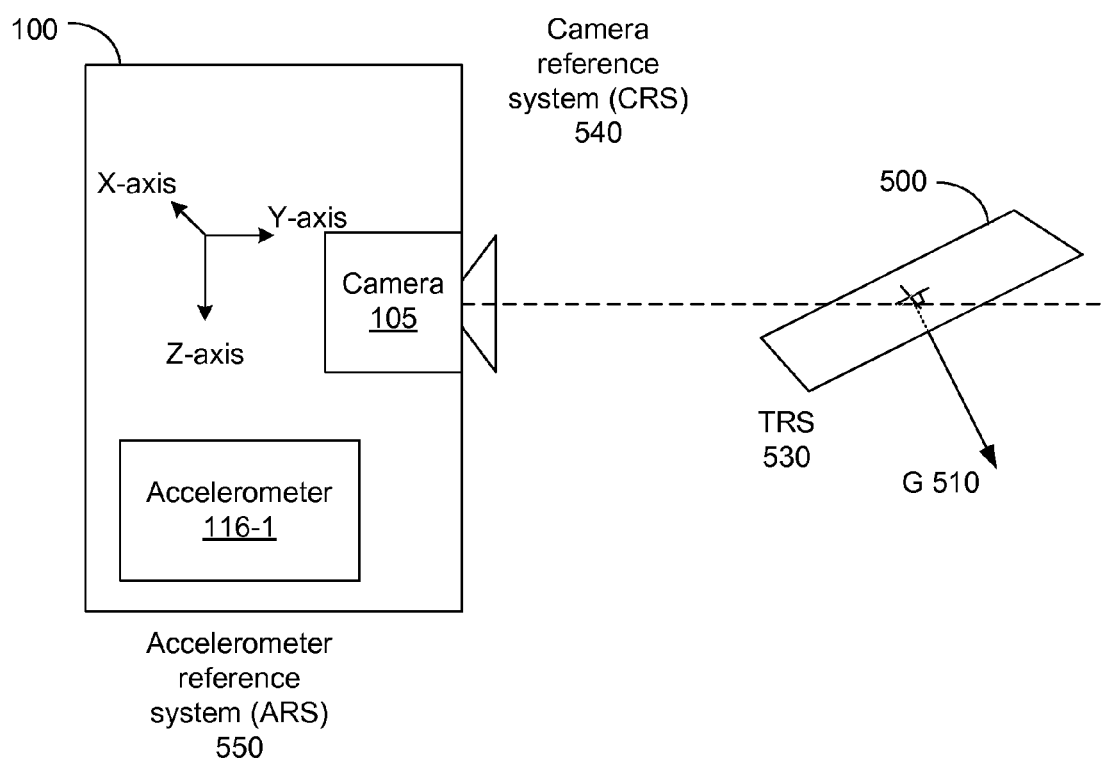
FIG. 8 shows a mobile device and a stationary planar target, in accordance with some embodiments of the present invention.

FIG. 8 shows a mobile device 100 and a stationary planar target 500, in accordance with some embodiments of the present invention. The mobile device 100 includes a camera 105 and an accelerometer 116-1. The camera 105 is directed towards the stationary planar target 500. Measurements with respect to the stationary planar target 500 may originate in the TRS 530. Measurements, such as an image, from a camera 105 originate in a camera reference system (CRS 540). Measurements from the accelerometer 116-1 originate in an accelerometer reference system (ARS 550).

Figure 9:
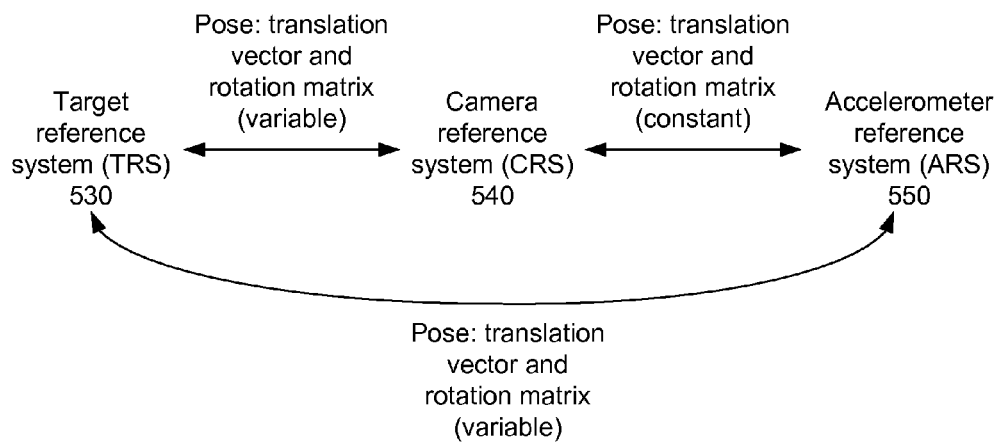
FIG. 9 relates various reference systems.

FIG. 9 relates various reference systems. Three reference systems shown are: (1) the target reference system (TRS 530), sometimes referred to as the target reference frame; (2) the camera reference system (CRS 540), sometimes referred to as the camera reference frame; and (3) the accelerometer reference system (ARS 550), sometimes referred to as the accelerometer reference frame. To convert between the TRS 530 and the CRS 540, a pose is determined from an image using a computer vision (CV) algorithm. The pose may define a translation vector and a rotation matrix, which are each variable and dependent on the relevant relationship between the camera 105 and the stationary planar target 500. To convert between the CRS 540 and the ARS 550, a constant pose may be used. The constant pose may be defined by a constant translation vector and a constant rotation matrix. The constant translation vector may comprise a displacement scalar and be between the camera 105 and the accelerometer 116-1. If no rotation exists between the CRS 540 and the ARS 550, an identity matrix may be used for the rotation matrix. In some implementations, however, the camera 105 and the accelerometer are soldered onto different parts of a common circuit board or on separate but connected circuit boards. To account for slight offsets of components due to misalignments, the constant rotation matrix may be slightly different than an identity matrix. To convert between the TRS 530 and the ARS 550, the computation may find an interim value in the CRS 540 or the first two translation vectors and the first two matrices may be combined to form a variable translation vector and a variable rotation matrix.

Figure 10:
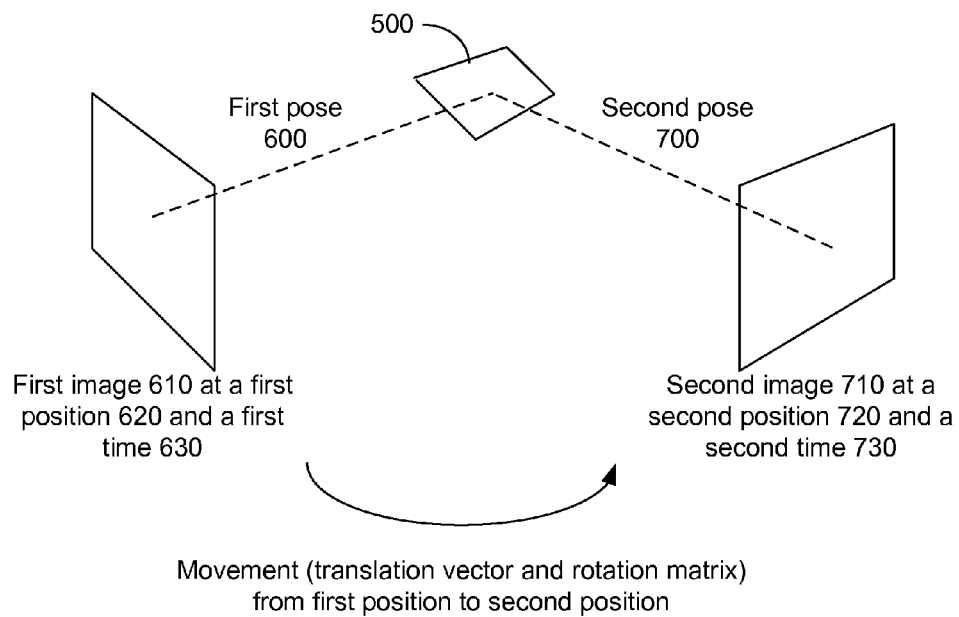
FIG. 10 shows two pose measurements.
Figure 11:
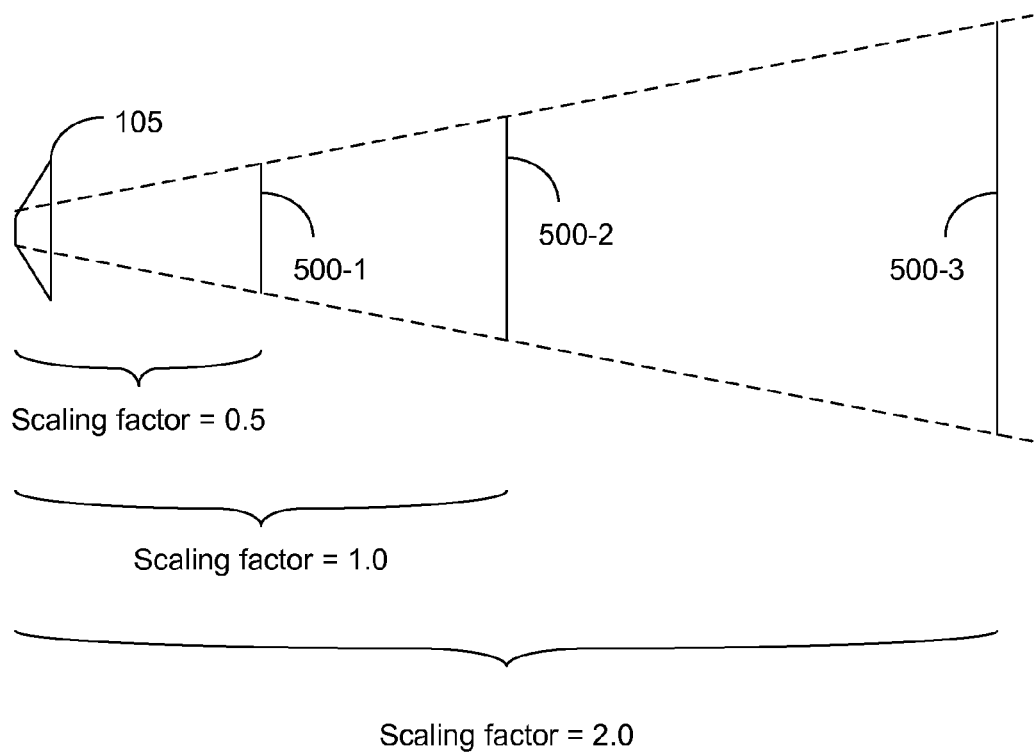
FIG. 11 illustrates a scaling ambiguity.
Figure 12:
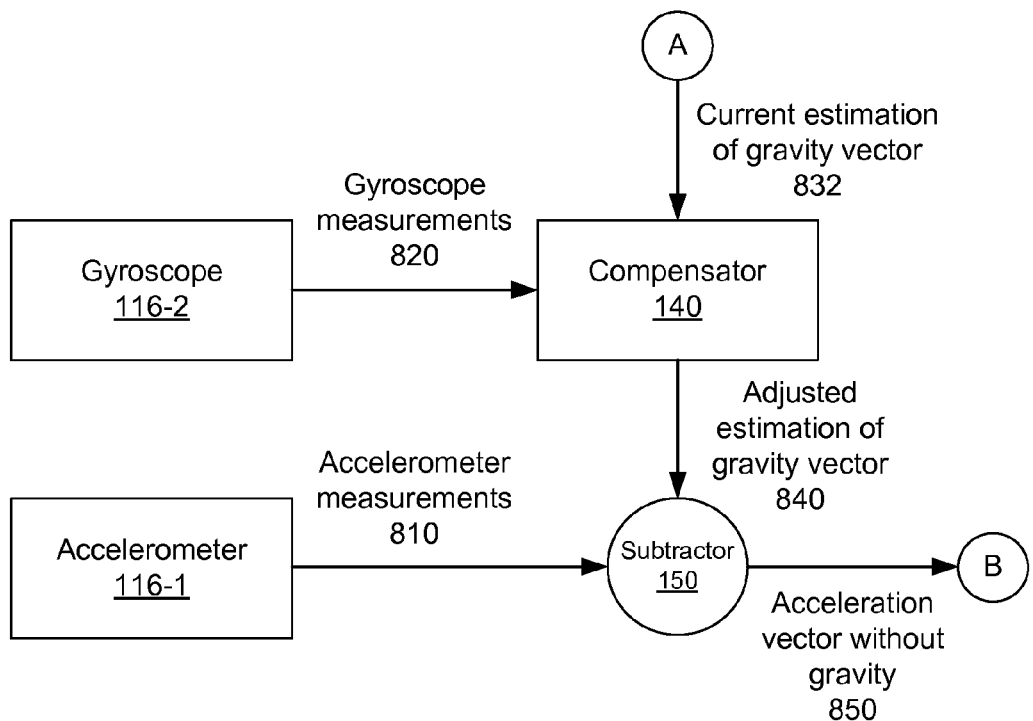
FIGS. 12 and 13 show modules to correct errors between an inertia-based pose and an image-based pose, in accordance with some embodiments of the present invention.
Figure 13:
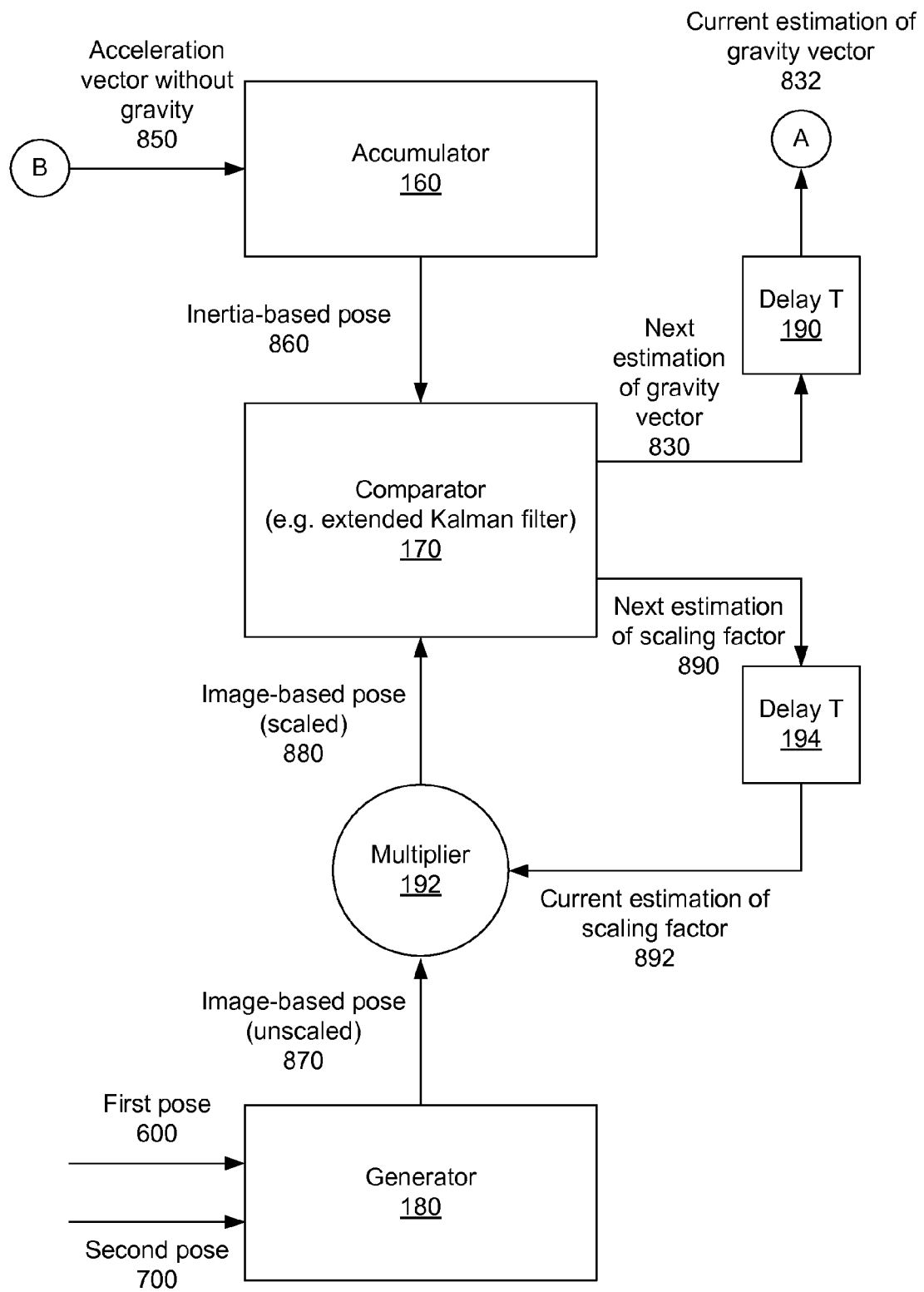
Figure 14:
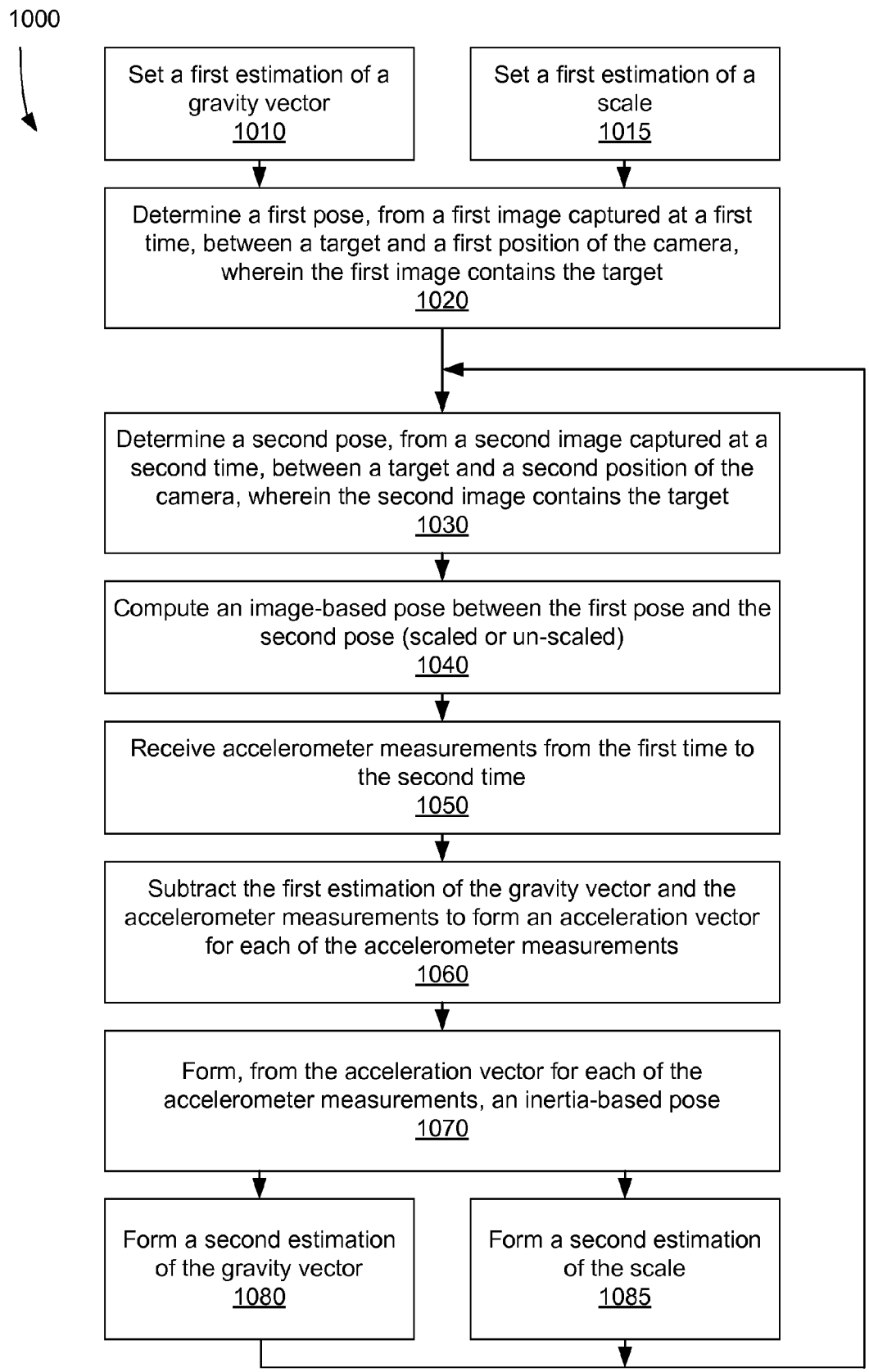
FIG. 14 shows a method for improving a gravity vector and scale, in accordance with some embodiments of the present invention.

The following description of FIG. 10-14 compares an inertia-based pose 860 from an accelerometer 116-1 with an image-based pose 880 from a first image 610 and a second image 710 from a camera 105. FIG. 10 shows that the camera 105 is assumed to have moved from a first position 620 at a first time 630 to a second position 720 at a second time 730. FIG. 10 also shows that the CV algorithm generates a first pose 600 and a second pose 700, which result in an image-based pose 880. FIG. 11 shows variations in a scaling factor assumed for a camera image. FIG. 12 and FIG. 13 show readings from an accelerometer 116-1 and a gyroscope 116-2 help to determine an inertia-based pose 860. In FIG. 13, comparison of the inertia-based pose 860 with the image-based pose 880 results in an error vector having an angular error and a scalar error. The error vector is known as an innovation sequence or innovation vector in Kalman-filter literature. FIG. 14 shows a method of estimating in a mobile device.

FIG. 10 shows two pose measurements. In the example, a first image 610 is captured from a first position 620 (relative orientation and distance from a stationary planar target 500) and at a first time 630. From a CV algorithm, for example, a first pose 600 between the TRS 530 and the CRS 540 may be computed. From the first time 630 to a second time 730, the camera 105 is moved from the first position 620 to a second position 720. The movement may be defined by a pose or a translation vector and a rotation matrix computed with accelerometer measurements 810 from an accelerometer 116-1 and gyroscope measurements 820 from a gyroscope 116-2, as explained below with reference to FIGS. 12 and 13. At the second position 720 and at the second time 730, the camera 105 captures a second image 710. Again, from a CV algorithm, for example, a second pose 700 is determined between the camera 105 and the stationary planar target 500. Translation and rotation from the first pose 600 to the second pose 700 may therefore define a CV or image-based pose 880 and corresponding rotation matrix.

FIG. 11 illustrates a scaling ambiguity. From a single image alone, a camera 105 cannot determine a scale of the stationary planar target 500. From the point of view of the camera 105, a stationary planar target 500 may be small and close to the camera 105 (e.g., stationary planar target 500-1), an average size and distance from the camera 105 (e.g., stationary planar target 500-2), or large and far from the camera 105 (e.g., stationary planar target 500-3). To accommodate stationary planar target 500 of different sizes, a scaling factor is used. For example, stationary planar target 500-1 is represented by a scaling factor of 0.5, stationary planar target 500-2 is represented by a scaling factor of 1.0, and stationary planar target 500-2 is represented by a scaling factor of 2.0. The scaling factor accounts for a distance the stationary planar target 500 is away from the camera 105.

FIGS. 12 and 13 show modules to correct errors between an inertia-based pose and an image-based pose, in accordance with some embodiments of the present invention. First, a process to determine an inertia-based pose is explained. In FIG. 12, accelerometer measurements 810 are received by a processor from an accelerometer 116-1. Before a pose may be determined, acceleration due to gravity is removed by subtractor 150 from the accelerometer measurements 810. The subtractor 150 may be a function or module in a processor 122. To determine acceleration due to gravity, a current guess or current estimation 832 of the gravity vector is compensated by compensator 140 between the first time and second time for each accelerometer measurement 810. The compensator 140 may be a function or module in a processor 122. The compensator 140 accumulates gyroscope measurements 820 and adds the result to the current estimation 832 of the gravity vector. The current estimation 832 of the gravity vector is set at the first time where a first estimation 832 of the gravity vector may be set to a vector perpendicular to the stationary planar target 500. Operation of the compensator 140 results in an adjusted guess or adjusted estimation 840 associated with a particular gyroscope measurement 820. The result of the subtractor 150 subtracting the adjusted estimation 840 of the gravity vector from the accelerometer measurements 810 may be an acceleration vector 850 without gravity. Processing continues in FIG. 13.

In the comparison of FIG. 13, the error vector may be computed directly from the vector difference between the inertia-based pose 860 and the image-based pose 880. Each of the elements of FIG. 13 may be a function or module in a processor 122. A new value for the inertia-based pose 860 may be solved for that minimizes the error vector. Similarly, a new vector for the image-based pose 880 may be solved for that minimizes the error vector. However, if estimating both a new scaling factor and a new gravity vector, a compromise or average may be selected, for example, as specified by corresponding Kalman filter gains (e.g., from an extended Kalman filter (EKF) algorithm) between the two solutions provides an intermediate result. In this manner, the error vector may be used to determine a better estimate of gravity. Similarly, the error vector may be used to determine a better estimate of the scaling factor 515.

In FIG. 13, the acceleration vector 850 without gravity is accumulated by accumulator 160. The accumulator 160 computes a translation from the acceleration vector 850 by a double integration, for example, by dead reckoning. The result of the accumulator 160 is the inertia-based pose 860. A comparator 170 determines the error vector and translates the error vector into a next guess or next estimation 830 of the gravity vector. A delay unit 190 accepts the next estimation 830 of the gravity vector and produces the current estimation 832 of the gravity vector. The current estimation 832 is held constant for a period T between the first time and the second time.

Also in FIG. 13, an image-based pose 880 is determined. The image-based pose 880 should be equivalent to the inertia-based pose 860. The two vectors (860, 880) are compared by the comparator 170 to form the next estimation 830 of the gravity vector and the next estimation 890 of the scaling factor, which are delayed by delay units 190 and 194, respectively, to hold the current values.

The first pose 600 and the second pose 700 are used by a generator 180 to compute a translation vector between the poses, thereby generating an image-based pose 870, which is un-scaled. The un-scaled image-based pose 870 is multiplied by the current estimation 892 of the scaling factor to produce a scaled image-based pose 880. The comparator 170 accepts the image-based pose 880 along with the inertia-based pose 860 to determine a next estimation 830 for the gravity vector and a next estimation 890 for the scaling factor. The next estimation 830 may be a gravity value that minimizes the error vector. The next estimation 890 may be a scaling factor that minimizes the error vector. Alternatively, the next estimation 830 and the next estimation 890 may be a compromise between these two solutions.

FIG. 14 shows a method 1000 for improving a gravity vector and scale, in accordance with some embodiments of the present invention. In some embodiments, a scaling factor may be assumed and a next estimation 830 of the gravity vector is determined. In other embodiments, the gravity vector is assumed and a next estimation 890 of the scaling factor is determined. Yet in other embodiments, guesses or estimations 830 for both the gravity and estimations 890 the scaling factor are determined as shown in the following example.

At 1010, a processor in the mobile device 100 (such as processor 122 of FIG. 2) sets a first estimation 832 of the gravity vector (also described above as G 510). For example, the first estimation 832 of the gravity vector may be perpendicular to a plane formed by a stationary planar target 500. At 1015, the processor sets a first estimation 892 of the scaling factor. For example, the first estimation 832 of the scaling factor may be set to unity. The processor may perform both 1010 and 1015 or either 1010 or 1015. Instead of setting a first estimation of the gravity vector and/or scaling factor in 1010 and/or 1015, the first estimate of a gravity vector and/or the first estimate of a scale may be preset, previously determined, previously set in memory, different for various AR applications, or set each time needed, for example.

At 1020, the processor determines a first pose 600, from a first image 610 captured at a first time 630, between a stationary planar target 500 and a first position 620 of the camera 105, wherein the first image 610 contains an image of the stationary planar target 500.

At 1030, the processor determines a second pose 700, from a second image 710 captured at a second time 730, between the stationary planar target 500 and a second position 720 of the camera 105, wherein the second image 710 also contains an image of the stationary planar target 500.

At 1040, the processor computes an image-based pose 880 between the first pose 600 and the second pose 700.

At 1050, the processor receives accelerometer measurements 810 from the first time 630 to the second time 730.

At 1060, the processor subtracts the first estimation 832 of the gravity vector and the accelerometer measurements 810 to form an acceleration vector 850 for each of the accelerometer measurements 810.

At 1070, the processor forms, from the acceleration vector 850 for each of the accelerometer measurements 810, an inertia-based pose 860.

At 1080, the processor forms a second estimation 830 of the gravity vector based on a difference between the image-based pose 880 and the inertia-based pose 860. At 1085, the processor also forms a second estimation 890 of the scaling factor based on the difference between the image-based pose 880 and the inertia-based pose 860. The processor may perform both 1080 and 1085 or either 1080 or 1085.

Processing repeats iteratively with refined values (the second estimation 830 for gravity and the second estimation 890 for the scaling factor), new gyroscope and accelerometer measurements, and a new image, at 1030. In sum, some embodiments use the processor 122 and/or the tracking unit 132 of FIG. 2 and/or the filter 302 of FIG. 3 to perform the elements of FIG. 14. In some embodiments, 1010 and/or 1015 are performed by the comparator 170 and/or camera 105 and/or sensors 116. In some embodiments, 1020 and/or 1030 are performed by the camera 105. In some embodiments, 1040 is performed by the generator 180. In some embodiments, 1050 is performed by the subtractor 150 receiving accelerometer measurements 810 from the accelerometer 116-1. In some embodiments, 1060 is performed by the subtractor 150. In some embodiments, 1070 is performed by the accumulator 160. In some embodiments, 1080 and 1085 are performed by the comparator 170.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable medium. Examples include non-transitory computer-readable media encoded with a data structure and computer-readable media encoded with a computer program. Non-transitory computer-readable media includes physical computer storage media. A storage medium may be any available medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method for estimating in a mobile device, the method comprising:
    determining a first pose, from a first image captured at a first time, between a target and a first position of a camera of the mobile device, wherein the first image contains the target;
    determining a second pose, from a second image captured at a second time, between the target and a second position of the camera, wherein the second image contains the target;
    computing an image-based pose between the first pose and the second pose using a first estimation of a scaling factor;
    receiving measurements from an accelerometer of the mobile device from the first time to the second time;
    forming an inertia-based pose based on the measurements from the accelerometer and a first estimation for a gravity vector;
    computing a difference between the image-based pose and the inertia-based pose; and
    forming at least one of a second estimation of the gravity vector or a second estimation of the scaling factor based on the difference.

2. The method of claim 1, further comprising capturing the first image from the first position at the first time and capturing the second image from the second position at the second time.

3. The method of claim 1, further comprising assuming the target comprises a planar target.

4. The method of claim 1, further comprising assuming the target comprises a stationary target.

5. The method of claim 1, wherein the first estimation of the gravity vector is perpendicular to the target.

6. The method of claim 1, wherein the first estimation of the gravity vector is along a Z-axis in a target reference system (TRS).

7. The method of claim 1, wherein the first pose and the second pose are in a camera reference system (CRS) and wherein the measurements are in an accelerometer reference system (ARS).

8. The method of claim 1, further comprising adjusting, for each of the measurements from the accelerometer, the first estimation of the gravity vector by an accumulative gyroscope measurement to compensate for rotation of the mobile device.

9. The method of claim 1, further comprising normalizing the measurements from the accelerometer by subtracting off the first estimation of the gravity vector for each of the measurements from the accelerometer.

10. The method of claim 1, wherein forming the inertia-based pose comprises dead reckoning.

11. The method of claim 1, wherein forming at least one of the second estimation of the gravity vector or the second estimation of the scaling factor based on the difference comprises forming the second estimation of the gravity vector based on the difference.

12. The method of claim 1, wherein forming at least one of the second estimation of the gravity vector or the second estimation of the scaling factor based on the difference comprises forming the second estimation of the scaling factor based on the difference.

13. The method of claim 1, wherein forming at least one of the second estimation of the gravity vector or the second estimation of the scaling factor based on the difference comprises forming both the second estimation of the gravity vector and the second estimation of the scaling factor based on the difference.

14. The method of claim 13, further comprising:
    determining a third pose, from a third image captured at a third time, between the target and a third position of the camera, wherein the third image contains the target;
    computing a next image-based pose between the second pose and the third pose based on the second estimation of the scaling factor;
    receiving next measurements from the accelerometer from the second time to the third time;
    forming a next inertia-based pose based on the next measurements from the accelerometer and the second estimation for the gravity vector; and
    computing a next difference between the next image-based pose and the next inertia-based pose.

15. The method of claim 14, further comprising forming at least one of a third estimation of the gravity vector or a third estimation of the scaling factor based on the next difference.

16. The method of claim 1, further comprising applying an estimate of the scaling factor to an augmented reality (AR) application, wherein the estimate of the scaling factor is based on the first estimation of the scaling factor.

17. The method of claim 1, further comprising applying an estimate of the gravity vector to an augmented reality (AR) application, wherein the estimate of the gravity vector is based on the first estimation of the gravity vector.

18. A mobile device for estimating in the mobile device, the mobile device comprising:
    a camera configured to:
        capture, at a first time and a first position of the camera, a first image containing a target; and
        capture, at a second time and a second position of the camera, a second image containing the target;

an accelerometer configured to provide measurements from the first time to the second time; and a processor coupled to the camera and to the accelerometer and configured to:
  determine a first pose between the target of the mobile device from the first image;
  determine a second pose between the target of the mobile device from the second image;
  compute an image-based pose between the first pose and the second pose using a first estimation of a scaling factor;
  form an inertia-based pose based on the measurements and a first estimation for a gravity vector;
  compute a difference between the image-based pose and the inertia-based pose; and
  form at least one of a second estimation of the gravity vector or a second estimation of the scaling factor based on the difference.

19. The mobile device of claim 18, wherein the target comprises a planar target.

20. The mobile device of claim 18, wherein the target comprises a stationary target.

21. The mobile device of claim 18, wherein the first estimation of the gravity vector is perpendicular to the target.

22. The mobile device of claim 18, wherein the first estimation of the gravity vector is along a Z-axis in a target reference system (TRS).

23. The mobile device of claim 18, wherein the processor is further configured to adjust, for each of the measurements, the first estimation of the gravity vector by an accumulative gyroscope measurement to compensate for rotation of the mobile device.

24. The mobile device of claim 18, wherein the processor is further configured to normalize the measurements by subtracting off the first estimation of the gravity vector for each of the measurements.

25. The mobile device of claim 18, wherein the processor configured to form at least one of the second estimation of the gravity vector or the second estimation of the scaling factor based on the difference comprises the processor configured to form both the second estimation of the gravity vector and the second estimation of the scaling factor based on the difference.

26. The mobile device of claim 18, wherein the processor configured to form the inertia-based pose comprises a processor configured to dead reckon.

27. The mobile device of claim 18, wherein the processor configured to form at least one of the second estimation of the gravity vector or the second estimation of the scaling factor based on the difference comprises a processor configured to form the second estimation of the gravity vector based on the difference.

28. The mobile device of claim 18, wherein the processor configured to form at least one of the second estimation of the gravity vector or the second estimation of the scaling factor based on the difference comprises a processor configured to form the second estimation of the scaling factor based on the difference.

29. The mobile device of claim 18, wherein the processor configured to form at least one of the second estimation of the gravity vector or the second estimation of the scaling factor based on the difference comprises a processor configured to form both the second estimation of the gravity vector and the second estimation of the scaling factor based on the difference.

30. The mobile device of claim 29, wherein the processor is further configured to:

determine a third pose, from a third image captured at a third time, between the target and a third position of the camera, wherein the third image contains the target;
compute a next image-based pose between the second pose and the third pose based on the second estimation of the scaling factor;
receive next measurements from the accelerometer from the second time to the third time;
form a next inertia-based pose based on the next measurements from the accelerometer and the second estimation for the gravity vector; and
compute a next difference between the next image-based pose and the next inertia-based pose.

31. The mobile device of claim 30, wherein the processor is further configured to form at least one of a third estimation of the gravity vector or a third estimation of the scaling factor based on the next difference.

32. The mobile device of claim 18, wherein the processor is further configured to apply an estimate of the scaling factor to an augmented reality (AR) application, wherein the estimate of the scaling factor is based on the first estimation of the scaling factor.

33. The mobile device of claim 18, wherein the processor is further configured to apply an estimate of the gravity vector to an augmented reality (AR) application, wherein the estimate of the gravity vector is based on the first estimation of the gravity vector.

34. A mobile device for estimating in the mobile device, the mobile device comprising:
  means for determining a first pose, from a first image captured at a first time, between a target and a first position of a camera of the mobile device, wherein the first image contains the target;
  means for determining a second pose, from a second image captured at a second time, between the target and a second position of the camera, wherein the second image contains the target;
  means for computing an image-based pose between the first pose and the second pose using a first estimation of a scaling factor;
  means for receiving measurements from an accelerometer of the mobile device from the first time to the second time;
  means for forming an inertia-based pose based on the measurements from the accelerometer and a first estimation for a gravity vector;
  means for computing a difference between the image-based pose and the inertia-based pose; and
  means for forming at least one of a second estimation of the gravity vector or a second estimation of the scaling factor based on the difference.

35. The mobile device of claim 34, wherein the target comprises a planar target.

36. The mobile device of claim 34, wherein the first estimation of the gravity vector is perpendicular to the target.

37. The mobile device of claim 34, further comprising means for adjusting, for each of the measurements, the first estimation of the gravity vector by an accumulative gyroscope measurement to compensate for rotation of the mobile device.

38. The mobile device of claim 34, further comprising means for normalizing the measurements by subtracting off the first estimation of the gravity vector for each of the measurements.

39. The mobile device of claim 34, wherein the means for forming at least one of the second estimation of the gravity vector or the second estimation of the scaling factor based on the difference comprises means for forming both the second estimation of the gravity vector and the second estimation of the scaling factor based on the difference.

40. A non-transitory computer-readable storage medium including program code stored thereon for a mobile device to estimate in the mobile device, wherein the program code comprises code to:
- determine a first pose, from a first image captured at a first time, between a target and a first position of a camera of the mobile device, wherein the first image contains the target;
- determine a second pose, from a second image captured at a second time, between the target and a second position of the camera, wherein the second image contains the target;
- compute an image-based pose between the first pose and the second pose using a first estimation of a scaling factor;
- receive measurements from an accelerometer of the mobile device from the first time to the second time;
- form an inertia-based pose based on the measurements and a first estimation for a gravity vector;
- compute a difference between the image-based pose and the inertia-based pose; and
- form at least one of a second estimation of the gravity vector or a second estimation of the scaling factor based on the difference.

* * * * *